(12) United States Patent
Bocquet et al.

(10) Patent No.: US 8,196,385 B2
(45) Date of Patent: Jun. 12, 2012

(54) TURBOMACHINE CONTROL SYSTEM

(75) Inventors: Denis Louis Bocquet, Bois le Roi (FR); Antoine Jean Baptiste Stutz, Madrid (ES); Cedric Montarou, Merignac (FR)

(73) Assignee: Hispano Suiza, Colobes (FR)

( * ) Notice: Subject to any disclaimer, the term of this patent is extended or adjusted under 35 U.S.C. 154(b) by 578 days.

(21) Appl. No.: 12/338,337

(22) Filed: Dec. 18, 2008

(65) Prior Publication Data
US 2009/0235631 A1 Sep. 24, 2009

(30) Foreign Application Priority Data
Dec. 20, 2007 (FR) ...................................... 07 60065

(51) Int. Cl.
*F02C 7/06* (2006.01)
(52) U.S. Cl. ..................................................... 60/39.08
(58) Field of Classification Search ................. 60/39.08, 60/802; 184/6.11; 244/60, 99.2
See application file for complete search history.

(56) References Cited

U.S. PATENT DOCUMENTS

| | | | |
|---|---|---|---|
| 2,611,440 A * | 9/1952 | Haworth et al. ................ 416/48 |
| 3,050,993 A * | 8/1962 | Draughon et al. ......... 73/862.16 |
| 4,546,745 A | 10/1985 | Brotherston |
| 4,607,486 A | 8/1986 | Cole |
| 5,159,808 A | 11/1992 | Kast |
| 6,286,299 B1 * | 9/2001 | Junquera ...................... 60/39.08 |
| 6,487,847 B1 | 12/2002 | Snow et al. |
| 7,845,177 B2 * | 12/2010 | Parsons ........................... 60/773 |
| 2002/0007982 A1 * | 1/2002 | Howard ........................ 184/6.2 |
| 2006/0070600 A1 * | 4/2006 | Hara .......................... 123/196 R |
| 2007/0130911 A1 | 6/2007 | Goldberg et al. |

FOREIGN PATENT DOCUMENTS

| EP | 1 018 598 A2 | 7/2000 |
|---|---|---|
| EP | 1 329 617 A2 | 7/2003 |

OTHER PUBLICATIONS

British Office Action issued Jun. 9, 2011, in Patent Application No. GB0822977.5.

* cited by examiner

*Primary Examiner* — Louis Casaregola
*Assistant Examiner* — Phutthiwat Wongwian
(74) *Attorney, Agent, or Firm* — Oblon, Spivak, McClelland, Maier & Neustadt, L.L.P.

(57) ABSTRACT

A turbomachine control system comprising an auxiliary hydraulic circuit with an auxiliary hydraulic pump, at least one hydraulic actuator, and at least one servo-valve, the auxiliary pump powering the actuator via the servo-valve. The auxiliary hydraulic circuit is connected in parallel with the main fuel or lubricating oil circuit of the turbomachine. Said auxiliary pump is driven by an electric motor.

8 Claims, 4 Drawing Sheets

TURBOMACHINE CONTROL SYSTEM

FIELD OF THE INVENTION

The invention relates to a system for controlling a turbomachine. It is applicable to any type of turbomachine, whether for terrestrial or aviation purposes, and it is more particularly applicable to airplane turbojets.

BACKGROUND OF THE INVENTION

In the field of the invention, the term "control system" is used to designate a system that serves in particular to control the operating speed of the turbomachine. By way of example, in an airplane turbojet, the system controls the flow rate of air passing through the turbojet, the flow rate of fuel into the combustion chamber, etc.

A control system generally comprises a plurality of actuators. By way of example, these actuators are air discharge valves or valves serving to adapt the geometry of the turbojet compressor.

More precisely, the invention relates to a turbomachine control system comprising an auxiliary hydraulic circuit with at least one hydraulic actuator and at least one servo-valve, the actuator being fed with liquid via the servo-valve. The hydraulic circuit of the control system is said to be "auxiliary" in order to distinguish it from the main hydraulic circuit of the turbomachine, to which it is connected.

It should be observed that hydraulic actuators are preferred over electromechanical actuators since they are more reliable and they are better adapted to the high-temperature conditions in the environment of a turbomachine. Furthermore, the use of electromechanical actuators generally constitutes a solution that is more expensive.

A known example of a control system of the above-specified type is shown in FIG. 1. The control system is fitted to airplane turbojets having a main fuel circuit 12 comprising: a low pressure pump 16 connected to a fuel tank 14; a heat exchanger 17; a high pressure pump 18; and a hydromechanical unit (HMU) 19. The low pressure and high pressure pumps 16 and 18 are mechanically driven by an accessory gearbox 22 of the turbojet. The high pressure pump 18 feeds the fuel injectors of the combustion chamber 20 of the turbojet via the HMU 19. This HMU 19 serves in particular to measure out the fuel needed by the combustion chamber 20, and to return excess fuel to the main circuit 12 upstream from the heat exchanger 17 via a recirculation loop 21.

The control system comprises an auxiliary hydraulic circuit 10 with a plurality of actuators referenced A1 to AN, where N is an integer greater than or equal to 1. There are only two actuators A1 and A2 in the example shown. Each actuator A1, A2 is fed via a servo-valve S1, S2. The auxiliary circuit 10 and its actuators A1, A2 are powered by the high pressure pump 18.

The drawback of such an installation lies in the fact that the high pressure pump 18 is driven by the accessory gearbox 22 of the turbojet, such that the hydraulic energy generated by the high pressure pump 18 depends on the speed of rotation of the drive shaft of the turbojet. Unfortunately, it is sometimes necessary to deliver a large amount of hydraulic energy to the actuators even at low speeds of rotation of the drive shaft of the turbojet. This applies in particular when relighting the turbojet in flight. An obvious modification to the system for this purpose would be to dimension the high pressure pump 18 so as to be capable of satisfying engine requirements under relighting conditions. Such a solution would be nevertheless unsatisfactory since the cylinder capacity of the high pressure pump 18 would then be much greater than required by the engine in its normal operating range. Furthermore, such overdimensioning of the high pressure pump 18 would have the drawback of increasing its weight.

Another drawback stems from the fact that the high pressure pump 18 is heavily loaded and therefore heats up more than a standard high pressure pump (i.e. a pump dedicated solely to injecting fuel into the combustion chamber 20), and the fuel passing through the pump 18 is likewise heated. Unfortunately, some of this heated fuel is reinjected into the main circuit 12 upstream from the heat exchanger 17, and is used as a cold source in the heat exchanger 17 (generally for the purpose of cooling the lubricating oil of the turbomachine). This leads to the heat exchanger 17 cooling poorly.

OBJECT AND SUMMARY OF THE INVENTION

An object of the invention is to resolve the above-mentioned drawbacks.

This object is achieved by a turbomachine control system comprising an auxiliary hydraulic circuit with an auxiliary hydraulic pump, at least one hydraulic actuator, and at least one servo-valve, the auxiliary pump powering the actuator via the servo-valve, the system being such that said auxiliary hydraulic circuit is suitable for being connected in parallel on the turbomachine's main hydraulic circuit for fuel or lubricating oil, and such that said auxiliary pump is driven by an electric motor.

The invention also provides a turbomachine including both a main hydraulic circuit for fuel or lubricating oil and a control system as defined above, wherein the auxiliary hydraulic circuit of the control system is connected in parallel on the main hydraulic circuit, the liquid flowing in the auxiliary circuit then being the fuel or the lubricating oil of the main circuit.

The control system of the invention is thus fitted with one or more hydraulic actuators, which are preferred over electromechanical actuators.

In addition, the fact that the auxiliary hydraulic circuit of the control system is designed to be connected in parallel on the main hydraulic circuit means that the hydraulic pump of the auxiliary circuit, referred to as the auxiliary pump, is distinct from pumps forming part of the main circuit (i.e. the low pressure and high pressure pumps of the main circuit). Consequently, hydraulic energy is delivered to the actuators by a dedicated auxiliary hydraulic pump (and not by a pump that is shared with the main circuit).

Since the dedicated auxiliary hydraulic pump is driven by an electric motor, the hydraulic energy generated by the auxiliary pump does not depend on the speed of rotation of the drive shaft of the turbomachine. The auxiliary pump can thus operate at any time to generate the hydraulic energy that is necessary and sufficient for the actuators (regardless of the speed of rotation of the drive shaft).

Since the auxiliary hydraulic pump is dedicated solely to operating actuators, it heats up little and the liquid (fuel or oil) passing through the auxiliary pump heats up little, thereby enabling it to cool the actuators and enabling it to be used effectively as a cold source in a heat exchanger.

By way of example, the auxiliary hydraulic pump is a positive displacement pump or a centrifugal pump, of fixed or variable cylinder capacity, optionally automatically regulated, and it is optionally associated with an energy accumulator device (for accumulating energy mechanically, electrically, or hydraulically).

When the turbomachine is an airplane turbojet, the electric motor driving said auxiliary pump can draw its power from the electricity network of the airplane and/or from an alternator driven by the accessory gearbox of the turbomachine. In one example of operation, when the turbojet is stopped, is starting, or is idling, the electric motor draws its energy from the electricity network of the airplane, and once the engine is operating faster than idling, the electric motor draws its power from the electricity network of the airplane and/or from an alternator driven by the accessory gearbox of the turbomachine, which alternator may also power other loads.

Finally, it should be observed that the liquid flowing in the hydraulic circuit of the control system is not a specific liquid, but rather the fuel or the oil of the main circuit of the engine. This has the advantage of simplifying maintenance operations.

BRIEF DESCRIPTION OF THE DRAWINGS

The invention and its advantages can be better understood on reading the following detailed description of embodiments of the invention. The description refers to the accompanying figures, in which.

MORE DETAILED DESCRIPTION

In the present application, the terms "upstream" and "downstream" are defined relative to the normal flow direction of the liquid (fuel or oil) in the circuit under consideration.

Figure 1:
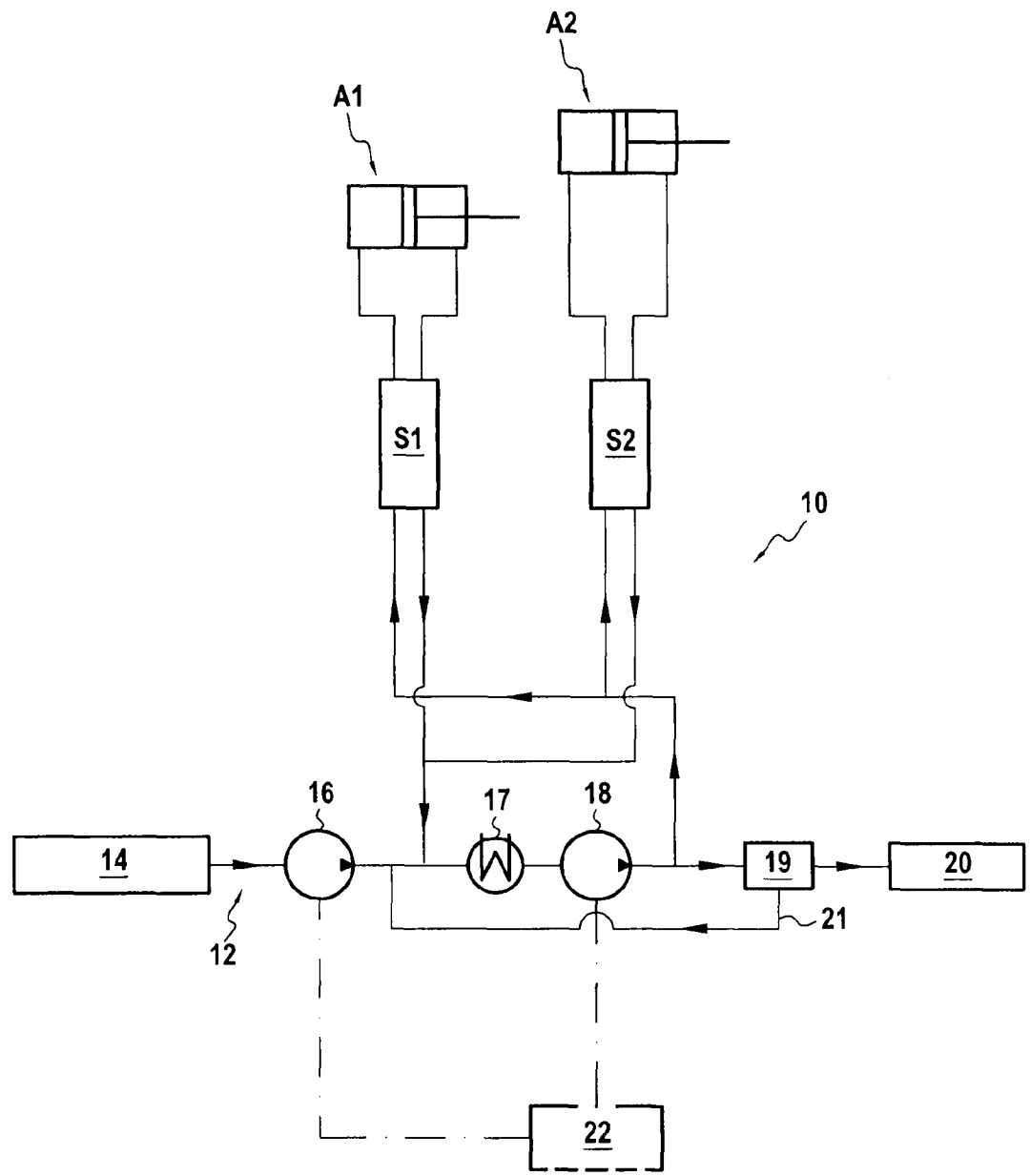
FIG. 1 is a schematic of the main fuel circuit of an airplane turbojet together with an example of a prior art control system.

FIG. 1 shows the prior art and is described above.

Figure 2:
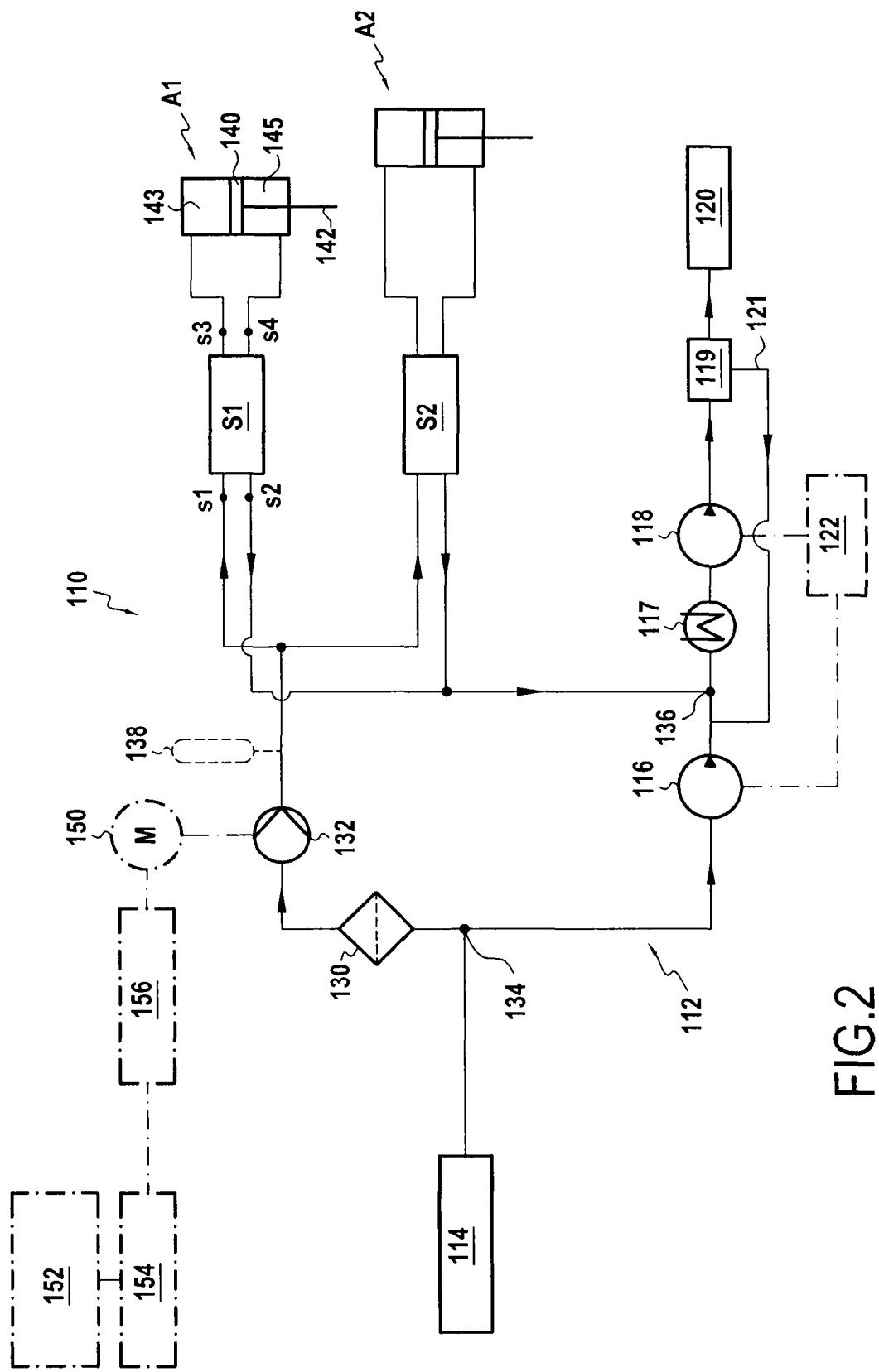
FIG. 2 is a schematic of the main fuel circuit of an airplane turbojet together with an example of a control system of the invention.

FIG. 2 shows the main fuel circuit 112 of an airplane turbojet. In the fuel flow direction, this circuit 112 comprises: a low pressure pump 116 connected to a fuel tank 114 (i.e. the airplane fuel tank); a heat exchanger 117; a high pressure pump 118; an HMU 119; and injectors for injecting fuel into the combustion chamber 120. The motors of the low pressure pump 116 and the high pressure pump 118 are driven by the accessory gearbox 122 of the turbojet. The low pressure pump 116 pumps the fuel from the tank 114, and the high pressure pump 118 feeds the fuel injectors of the combustion chamber 120 via the HMU 119. This HMU 119 serves in particular to measure out the fuel required by the combustion chamber 120, returning excess fuel to the main circuit 112 upstream from the heat exchanger 117 via a recirculation loop 121. The heat exchanger 117 uses fuel as a cold source for cooling the lubricating oil (hot source) of the turbojet.

An example of a control system is connected to the main circuit 112. This control system comprises an auxiliary hydraulic circuit 110 that comprises, in the fuel flow direction: an auxiliary hydraulic pump 132; servo-valves S1 to SN; and actuators A1 to AN; where N represents an integer greater than or equal to 1. In the example of FIG. 2, only two servo-valves S1 and S2 and two actuators A1 and A2 are shown. Optionally, the auxiliary circuit 110 may also include a filter 130 upstream from the auxiliary pump 132, and an accumulator 138 downstream from the auxiliary pump 132.

In accordance with the invention, the auxiliary circuit 110 is connected in parallel relative to the main fuel circuit 112. In other words, the auxiliary circuit 110 extends between two connection points 134, 136 to the main circuit 112. The first connection point 134 constitutes the entry point for liquid into the auxiliary circuit 110, and the second connection point 136 constitutes the exit point for the liquid from the auxiliary circuit 110. The auxiliary hydraulic pump 132, the servo-valves S1 to SN, and the actuators A1 to AN are thus situated between the connection points 134 and 136. In the example, the first connection point 134 is situated between the fuel tank 114 and the low pressure pump 116, and the second connection point 136 is situated between the low pressure pump 116 and the high pressure pump 118 (in this example upstream from the heat exchanger 117).

Each actuator A1, . . . , AN is powered by the auxiliary pump 132 via a respective servo-valve S1, . . . , SN, and the actuator-and-servo-valve pairs are connected in parallel with one another downstream from the auxiliary pump 132 and upstream from the second connection point 136.

In the example, each hydraulic actuator A1, . . . , AN is constituted by a cylinder containing a piston 140 secured to a rod 142 and defining two chambers 143 and 145. The auxiliary pump 132 feeds both chambers 143 and 145 of an actuator via a corresponding electrohydraulic servo-valve S1, . . . , SN.

An electrohydraulic servo-valve is a conventional commercially available component comprising a slide that is movable under drive from an electrically controlled torque motor. The slide may occupy a plurality of different positions serving to connect one or other of the chambers 143 and 145 of the actuator A1, . . . , AN to the auxiliary hydraulic pump 132. Depending on the command given by the torque motor, the slide can also occupy so-called "intermediate" positions in which the rate at which liquid is delivered by the servo-valve is different.

In this example, each servo-valve S1, . . . , SN has four connections referenced s1, s2, s3, and s4, the first connection s1 being connected to the outlet connection of the auxiliary pump 132, the second connection s2 being connected to the second connection point 136 and thus to the main turbomachine fuel circuit 112, while the third and fourth connections s3 and s4 are connected respectively to the chambers 143 and 145 of the corresponding actuator A1, . . . , AN.

Thus, in the embodiment shown, the inlet connection to the auxiliary pump 132 is connected to the main fuel circuit 112 upstream from the low pressure pump 116, and one of the connections of each servo-valve S1, . . . , SN (here the second connection s2) is connected to the main fuel circuit 112 between the low pressure pump 116 and the high pressure pump 118 of that circuit.

In another embodiment (not shown), the inlet connection to the auxiliary pump 132 is connected to the main fuel circuit 112 downstream from the low pressure pump 116, and one connection of each servo-valve S1, . . . , SN is connected to the main fuel circuit 112 between the low pressure pump 116 and the high pressure pump 118 of that circuit.

In accordance with the invention, the auxiliary pump 132 is driven by an electric motor 150. In the example shown, the electric motor 150 of the pump draws its energy from the electricity network 152 of the airplane, via a current rectifier 154 and an electronic system 156 for controlling the motor 150.

Figure 3:
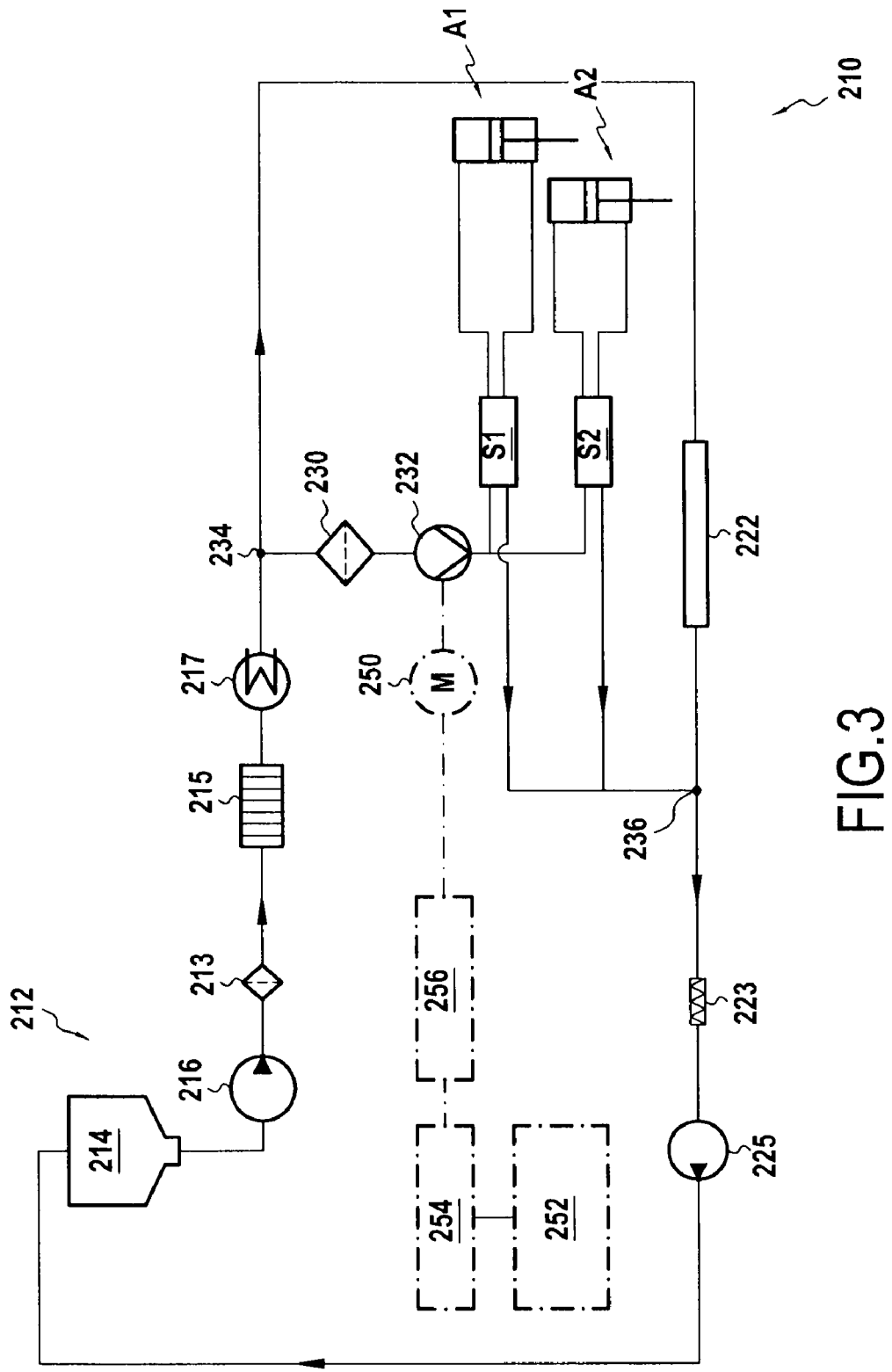
FIG. 3 is a schematic of the main oil circuit of an airplane turbojet together with another example of a control system of the invention.

With reference to FIG. 3 there follows a description of another element of a control system of the invention.

This other example differs from that of FIG. 1 in that it is connected to the main circuit 212 for the lubricating oil of the airplane turbojet (and not to the fuel circuit). The control system of FIG. 3 comprises an auxiliary hydraulic circuit 210 with elements analogous to those of the system of FIG. 2, namely, in the oil flow direction: an (optional) filter 230; a hydraulic pump 232; servo-valves S1 to SN; and actuators A1 to AN; where N represents an integer greater than or equal to 1. The auxiliary circuit 210 extends between two connection points 234 and 236 to the main circuit 212, and all of the above-mentioned elements (including the auxiliary pump 232) thus extend between both those two connection points 234, 236. The auxiliary pump 232 is driven by an electric motor 250, with the electric motor 250 drawing its power from the electricity network 252 of the airplane via a current rectifier 254 and an electronic system 256 for controlling the motor 250.

In the fluid flow direction, the main oil circuit 212 comprises: an oil tank 214; a main pump 216; a main filter 213; a first heat exchanger 215; and a second heat exchanger 217. The first heat exchanger 215 exchanges heat between air and oil, while the second heat exchanger 217 exchanges heat between oil and fuel.

The main pump 216 feeds oil to various portions of the turbojet, including the accessory gearbox 222 of the turbojet and the engine sump(s). Only the circuit powering the accessory gearbox 222 is shown in FIG. 3. In order to return oil to the tank 214, a subsidiary pump 225 preceded by a filter 223 is situated downstream from the accessory gearbox 222.

In this example, the first connection point 234 to the main circuit 212 is situated between the main pump 216 and the accessory gearbox 222, here downstream from the heat exchangers 215 and 217. The second connection point 236 is situated between the accessory gearbox 222 and the tank 214, here between the accessory gearbox 222 and the subsidiary pump 225.

Thus, in the embodiment shown, the inlet connection of said auxiliary pump 232 is connected to the main oil circuit 212 downstream from the main pump 216, and one connection of each servo-valve S1, . . . , SN is connected to the main oil circuit, upstream from the subsidiary pump 225.

Figure 4:
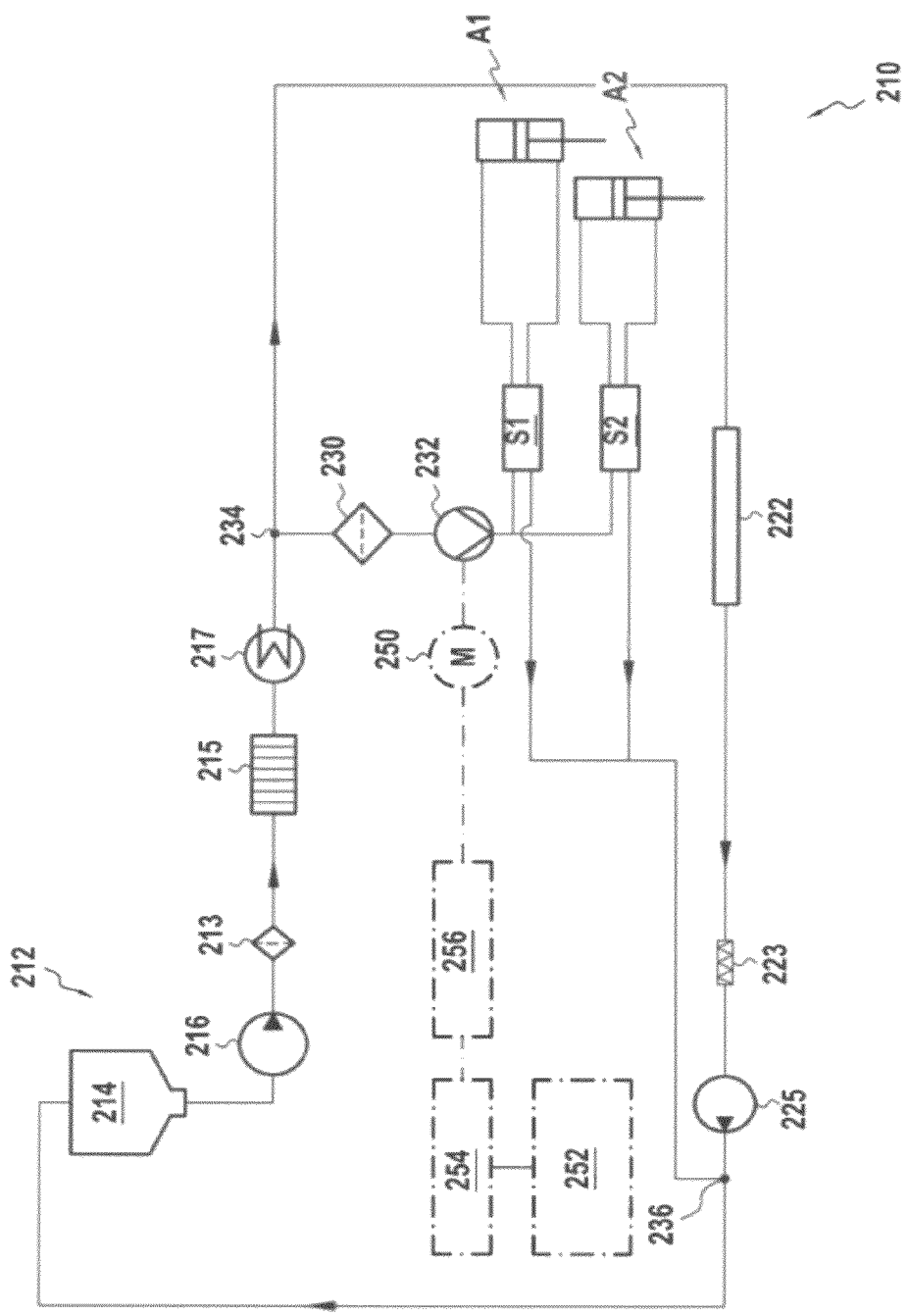
FIG. 4 is a schematic of the main oil circuit of an airplane turbojet together with another example of a control system of the invention.

In another embodiment illustrated in FIG. 4, the inlet connection of said auxiliary pump 232 is connected to the main oil circuit 212 downstream from the main pump 216 of said main circuit 212, and one connection of each servo-valve S1, . . . SN is connected to the main oil circuit 212 downstream from the subsidiary pump 225.

In another embodiment (not shown), the inlet connection of said auxiliary pump 232 is connected to the main oil circuit 212 at the oil tank 214, and one connection of each servo-valve S1, . . . , SN is likewise connected to the main oil circuit 212 at the oil tank 214.

What is claimed is:

1. A turbomachine comprising:
a hydraulic main circuit for lubricating oil; and
a control system including a hydraulic auxiliary circuit with at least one hydraulic actuator and at least one servo-valve,
wherein said hydraulic auxiliary circuit is connected in parallel on the hydraulic main circuit, a liquid flowing in the hydraulic auxiliary circuit then being the lubricating oil from the hydraulic main circuit, and
wherein said hydraulic auxiliary circuit includes an auxiliary hydraulic pump powering said hydraulic actuator via said at least one servo-valve, said auxiliary pump being driven by an electric motor,
wherein the hydraulic main circuit includes a main pump and a subsidiary pump,
wherein the auxiliary hydraulic pump has an inlet connection connected to the hydraulic main circuit downstream from the main pump and between the main pump and the subsidiary pump, and
wherein the at least one servo-valve is connected to the hydraulic main circuit upstream from said subsidiary pump.

2. A turbomachine according to claim 1, wherein said at least one servo-valve presents four connections: a first connection being connected to an outlet connection of said auxiliary pump; a second connection being connected to said hydraulic main circuit; and third and fourth connections being connected to said hydraulic actuator.

3. A turbomachine including:
a hydraulic main circuit for lubricating oil, and
a control system including a hydraulic auxiliary circuit with at least one hydraulic actuator and at least one servo-valve,
wherein said hydraulic auxiliary circuit is connected in parallel on the hydraulic main circuit, a liquid flowing in the auxiliary circuit then being the lubricating oil from the hydraulic main circuit,
wherein said hydraulic auxiliary circuit includes an auxiliary hydraulic pump powering said hydraulic actuator via said at least one servo-valve, said auxiliary pump being driven by an electric motor,
wherein the hydraulic main circuit of the turbomachine includes a main pump and a subsidiary pump,
wherein auxiliary pump includes an inlet connection connected to the hydraulic main circuit downstream from said main pump and between the main pump and the subsidiary pump, and
wherein the at least one servo-valve is connected to the hydraulic main circuit downstream from said subsidiary pump.

4. A turbomachine according to claim 1, consisting in an airplane turbojet and wherein said electric motor draws power from an electricity network of an airplane.

5. A turbomachine according to claim 1, consisting in an airplane turbojet and wherein said electric motor draws power from an alternator driven by an accessory gearbox of the airplane turbojet.

6. A turbomachine according to claim 3, wherein each servo-valve includes four connections: a first connection being connected to an outlet connection of said auxiliary pump; a second connection being connected to said hydraulic main circuit; and third and fourth connections being connected to said hydraulic actuator.

7. A turbomachine according to claim 3, consisting in an airplane turbojet and wherein said electric motor draws power from an electricity network of an airplane.

8. A turbomachine according to claim 3, consisting in an airplane turbojet and wherein said electric motor draws power from an alternator driven by an accessory gearbox of the airplane turbojet.

* * * * *